Oct. 28, 1941.　　　A. C. LIND　　　2,261,090
TRITURATING APPARATUS
Filed April 26, 1939　　　3 Sheets-Sheet 1

Inventor
Arthur C. Lind,
By
B. B. Collings
Attorney

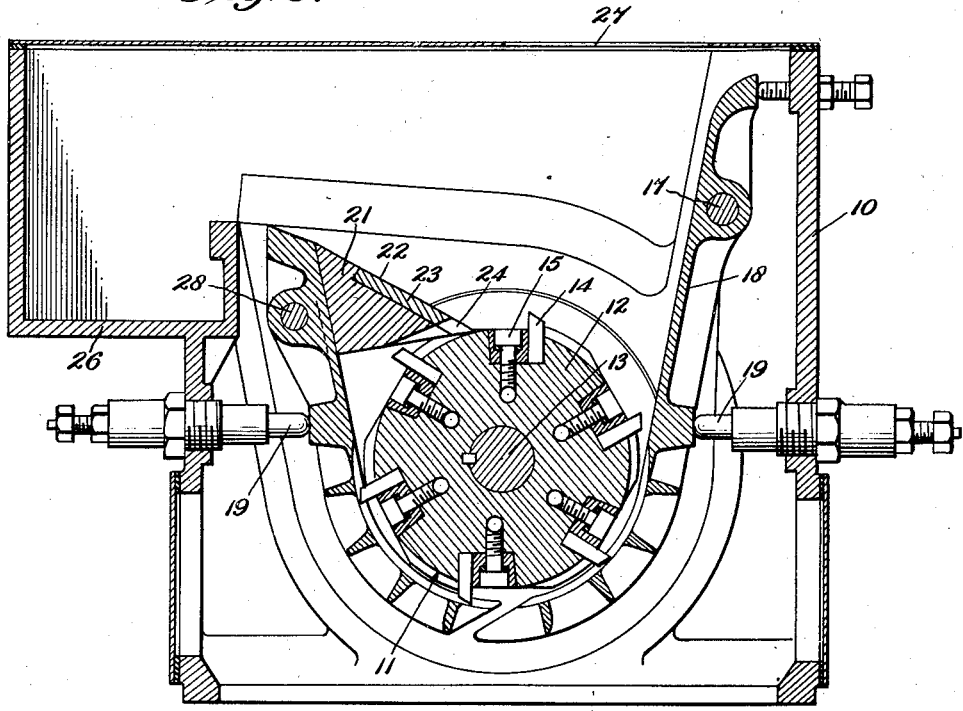
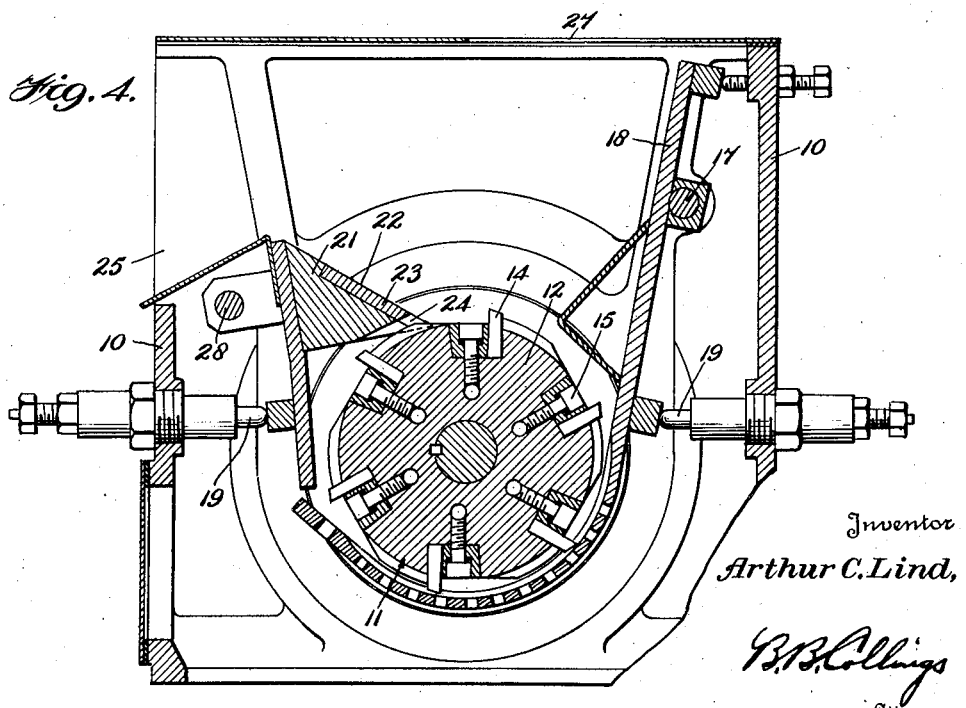

Oct. 28, 1941.  A. C. LIND  2,261,090
TRITURATING APPARATUS
Filed April 26, 1939   3 Sheets-Sheet 3

Inventor
Arthur C. Lind,
By
B. B. Collings
Attorney

Patented Oct. 28, 1941

2,261,090

UNITED STATES PATENT OFFICE 2,261,090

TRITURATING APPARATUS

Arthur C. Lind, Milwaukee, Wis., assignor to Chain Belt Company, Milwaukee, Wis., a corporation of Wisconsin Application April 26, 1939, Serial No. 270,246

1 Claim. (Cl. 83—6)

The invention relates to triturating apparatus of the general type illustrated and described in the prior U. S. patents to Eskil W. Swenson, No. 2,122,965, granted July 5, 1938, and William B. Marshall, No. 2,131,689, granted September 27, 1938, and has for one of its objects to provide improved means for eliminating hard objects, such as tramp metal, from the material fed to the triturator, thereby protecting the cutter members and other portions of the apparatus against injury.

In the apparatus described in the said prior patents, the parts are constructed and arranged to triturate or shread the soft solids and semi-solids present in garbage, sewage screenings and the like, but the action is purely a shredding or shearing one, and the parts are not designed to crush hard objects which may occasionally be encountered, such as stones, tramp metal and the like. Although a measure of protection against damage is provided in the prior apparatus through the spring pressed pendulously hung grids which co-operate with rotary cutters to effect the shearing or shredding, which grids yield and swing outwardly when a hard object enters the apparatus in the raw material, experience in actual practice has demonstrated that in quite a number of instances the rotary cutters and/or other parts of the mechanism have been injured through contact with stones, tramp iron, etc., necessitating replacement of such parts.

It is one of the principal objects of the present invention to provide a construction affording further protection against damage to the cutters and/or other parts of the triturator as a result of contact with hard, unshearable objects, by causing such objects to be moved up an inclined surface into a receptacle or "tramp metal catcher" by a wedging action of the rotor and cutters.

With the above and other objects in view which will appear as the description proceeds, the invention consists in the novel details of construction and combination of parts more fully hereinafter disclosed and particularly pointed out in the appended claim.

Referring to the accompanying drawings forming a part of this specification, in which like reference characters designate like parts in all the views—

Figs. 3, 4, 5 and 6 are views similar to Fig. 1, each showing a somewhat modified form of construction.

Figure 1:
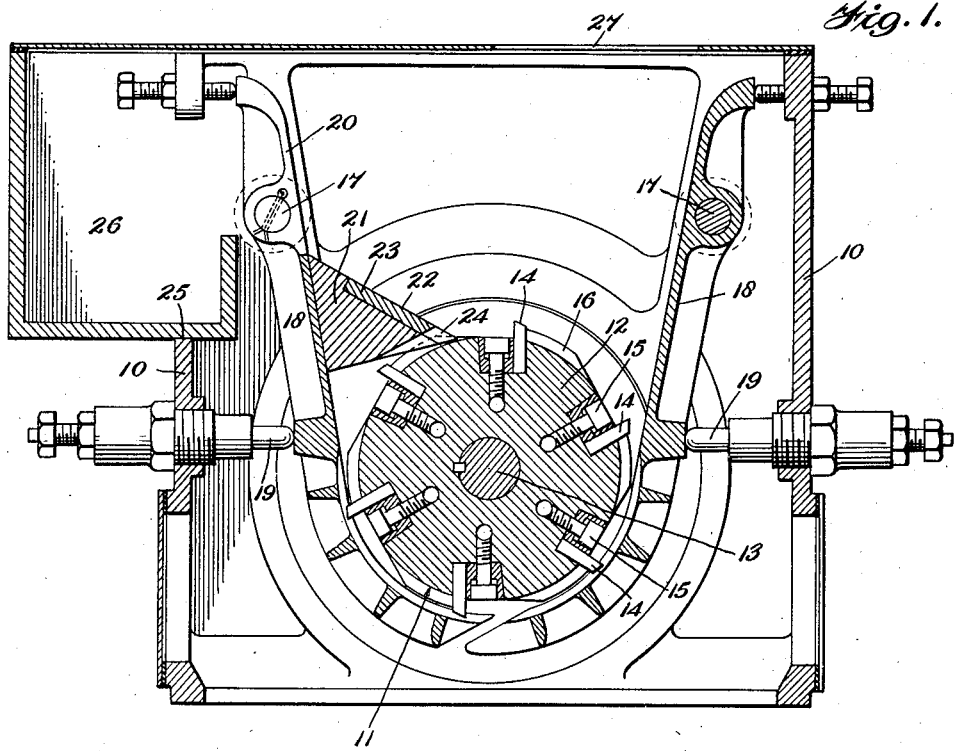
Figure 1 is a transverse vertical sectional view through a triturating apparatus of the class described, modified in accordance with one form of the present invention.
Figure 2:
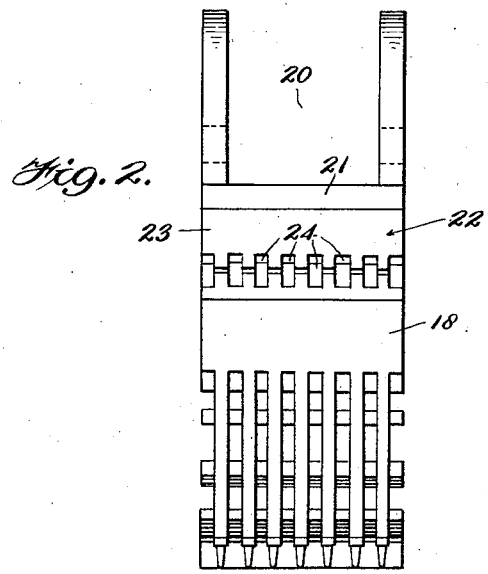
Fig. 2 is a front elevational view of the left hand grid shown in Fig. 1. which carries the member which co-operates with the rotor and cutters in the harmless removal of the tramp metal or other hard objects.

Referring more particularly to Figs. 1 and 2, it will be noted that the triturator is of the same general construction as that disclosed in the said prior Swenson and Marshall patents, in that it comprises a housing 10, in which is mounted for rotation a rotor 11. The construction of this rotor may be substantially the same as that of the said prior patents wherein a plurality of disks 12 were rigidly mounted upon a driven shaft 13 which was journalled in the housing, which disks were recessed at spaced points around their peripheries for the reception of removable cutters 14 held in place by any suitable retaining means 15. The cutters 14 are of substantially the same width as the disks 12 and adjacent disks are spaced apart by spacing disks, portions of which are indicated at 16.

Within the casing is pendulously hung on pivot rod 17 a pair of grid members 18 the lower portions of which are curved to substantially completely surround the lower half of the rotor periphery as clearly indicated in Fig. 1. These said curved lower portions are of grid like construction as in the prior patents, and the said members 18 are yieldingly urged inwardly toward the rotor periphery by spring pressed plungers 19.

The right hand grid member as viewed in Fig. 1 may be substantially identical with that of the said prior patents, but the left hand member, which faces the cutters 14 when rotated in the direction of the arrow shown on the drawings, is modified in accordance with this form of the invention by cutting away the upper portion thereof as indicated at 20. Just below the cut away portion 20 this grid member has rigidly secured to it by welding or in any other suitable manner, a member 21 here shown as being substantially triangular in cross section and having a surface 22 which extends in an angular direction from closely adjacent the rotor periphery to the lower edge of the cut away portion 20. This upper surface of the member 21 may be provided with a hardened wearing block or member 23 and the edge of the members 21 and 23 adjacent the rotor is serrated or notched as indicated at 24 to permit passage of the cutter members 14 and initiate the shearing or shredding action. It will be understood that the member 21 may be an integral part of the grid member 18, on which it is mounted, without departing from the scope of this invention.

The wall of the casing 10 behind the cut away portion 20 of the left hand grid member 18 is provided with an opening 25 in which may be introduced a receptacle 26 for receiving the tramp metal or other hard and unshreddable objects.

In operation should a stone, a piece of tramp metal, or other hard object be introduced into the triturator through the opening 27 along with the soft solids and semi-solids of garbage or sewage refuse, such hard object will be struck by the cutters 14 as they rotate in a counter-clockwise direction as viewed in Fig. 1, and moved to the adjacent edge of the members 21 and 23, and then forced by a wedging action between the rotor blades 14 and members 21 and 23 up the inclined surface 22 to pass through the cut away portion 20 of the grid and into the receptacle 26. The cutters, grids and other portions of the triturator will thus be protected against damage by such hard objects which in the past has been occasioned by their being carried around by the cutters between the grids.

The construction shown in Fig. 3 is closely analogous to that illustrated in Figs. 1 and 2, except that here the upper portion of the left hand grid instead of being cut away as shown in Fig. 2 is dispensed with entirely and the grid is pivoted on a through rod 28 disposed opposite the triangular shaped member 21. The receiving receptacle 26 is also here shown as being formed as an integral part of the housing 10.

In Figs. 1 and 3 the grid structure has been shown in the form of castings as was the case in the said prior Swenson and Marshall patents. In Fig. 4, however, there is illustrated a construction in which the grids are fabricated largely from iron or steel plates. In this form the right hand grid is extended to embrace nearly 180° of the rotor periphery while the left hand grid, the top of which is again cut off as in Fig. 3, has its lower portion also eliminated and it serves in effect as little more than a support for the triangular shaped member 21. In other words in this form substantially all of the shearing or shredding action is performed by the cutters in conjunction with the right hand grid.

Figure 5:
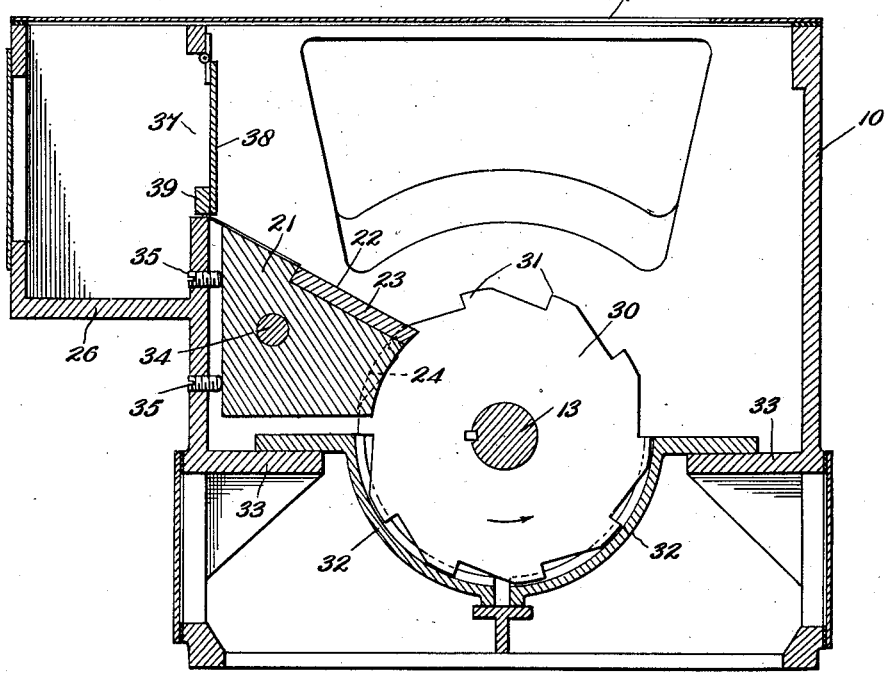

In Fig. 5 there is illustrated a still further modified form in which the rotor instead of being provided with removable cutters comprises spaced disks 30 having integral cutting members 31 formed around its periphery. Here also the pivoted grids are replaced by fixed grid members 32 mounted upon brackets or other supports 33 constituting a portion of the housing 10, while the member 21 is pivotally mounted upon a rod 34 around which it may be pivotally adjusted relative to the rotor periphery by means of adjusting screws 35. Here again the receiving receptacle 26 is shown as constituting an integral part of the housing 10, and the opening 37 through which the tramp metal or other hard objects pass into the receptacle is normally closed by a pivoted gate 38 which may be provided with a weight 39 by means of which it will be maintained in the closed position shown in Fig. 5 through the action of gravity.

Figure 6:
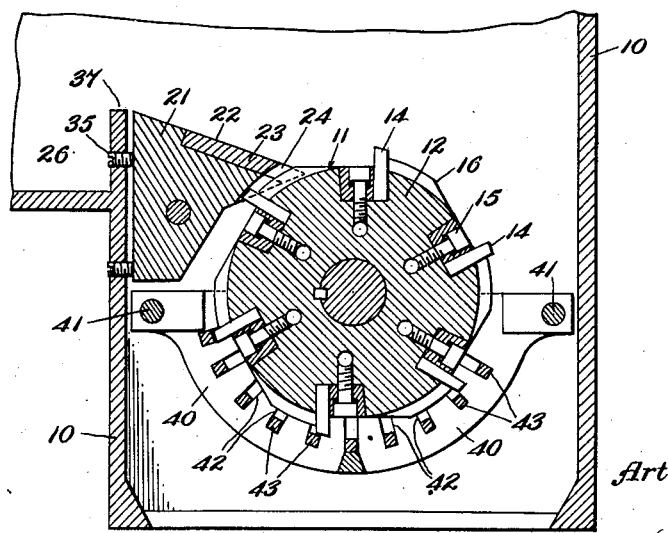

The form shown in Fig. 6 is analogous to that shown in Fig. 5 insofar as the arrangement of the member 21 is concerned, but here again the rotor is shown as of the replaceable cutter type. However the grid members are here illustrated as comprising a series of axially spaced bars 40 hung upon rods 41 extending from one end of the casing to the other, which bars are provided with notches or recesses 42 around their inner circumference in which notches removable axially extending cutter bars 43 are mounted. These cutter bars 43 are preferably square in cross section and they may be taken out and turned around several times through an angle of 90° to present new shearing or shredding edges as wear takes place.

The action of all forms of the invention is substantially the same as that described in connection with Figs. 1 and 2 and actual practice has demonstrated the efficacy of the construction in materially reducing damage to the cutters and other parts of the apparatus through the introduction of tramp metal or other hard objects along with the soft solids and semi-solids.

While several forms of the invention have been illustrated and described it is obvious that those skilled in the art may further vary the details of construction as well as the precise arrangement of parts without departing from the spirit of the invention and therefore it is not wished to be limited to the above disclosure except as may be required by the claim.

What is claimed is:

Triturating apparatus of the class described, comprising a housing; a rotor mounted therein provided with circumferentially and longitudinally spaced cutters; a grid adjacent said rotor having portions co-operating with said cutters to shear or shred soft solids and semi-solids; and an intercepting member mounted in said housing in advance of said shearing or shredding portions of the grid, said member having a surface extending angularly away from the surface of the rotor and disposed to intercept hard unshredable objects propelled by the rotor and cutters toward said shredding portions of the grid and prevent said objects from being carried to said grid portions, said member also having portions extending into the longitudinal spaces between the cutters whereby it may also co-operate with them in shearing or shredding the soft solids and semi-solids.

ARTHUR C. LIND.